US005734109A

United States Patent [19]
Thanscheidt

[11] Patent Number: 5,734,109
[45] Date of Patent: Mar. 31, 1998

[54] INDICATOR DEVICE

[75] Inventor: Gunter Thanscheidt, Hilden, Germany

[73] Assignee: itm, Ute Thanscheidt, Hilden, Germany

[21] Appl. No.: 883,280

[22] Filed: Jun. 26, 1997

Related U.S. Application Data

[63] Continuation of Ser. No. 662,914, Jun. 13, 1996, abandoned.

[30] Foreign Application Priority Data

Jun. 14, 1995 [DE] Germany .................. 195 22 786.7

[51] Int. Cl.⁶ ........................................... G01L 7/16
[52] U.S. Cl. .................. 73/744; 73/715; 73/146.8; 116/34 R
[58] Field of Search ........................ 73/146.8, 744, 73/715; 116/34 R

[56] References Cited

U.S. PATENT DOCUMENTS

| | | |
|---|---|---|
| 1,397,728 | 11/1921 | Evans ........................... 73/744 |
| 1,421,774 | 4/1922 | Harder ......................... 73/744 |
| 3,975,959 | 8/1976 | Larkin .......................... 73/744 |
| 4,433,579 | 2/1984 | Horn ............................ 73/715 |

*Primary Examiner*—George M. Dombroske
*Assistant Examiner*—Joseph L. Felber
*Attorney, Agent, or Firm*—Collard & Roe, P.C.

[57] ABSTRACT

The invention relates to an indicator device 1, especially for use as a manometer, with a housing 2 provided with an inlet for the pressurized medium to be measured and a spring-loaded piston 13 which can come into contact with the pressurized medium. The precision of the pressures indicated can be increased and the size can be made especially compact when the piston is designed as a control piston 13 and is in a working connection with an indicator element 5 via a groove and projection combination 39, 40 which translates the stroke of the control piston 13 into a rotating movement of the indicator element 5.

11 Claims, 3 Drawing Sheets

INDICATOR DEVICE

This is a continuation of application Ser. No. 08/662,914 filed on Jun. 13, 1996 now abandoned.

BACKGROUND OF THE INVENTION

1. Field of the Invention

The invention relates to an indicator device, especially for use as a manometer, with a housing provided with an inlet for the pressurized medium to be measured and a spring-loaded piston which can come into contact with the pressurized medium.

2. Prior Art

Indicator devices for pressure systems are required whenever the pressure must not go below a minimum and optionally must not exceed a maximum pressure. Therefore, indicator devices, for example manometers, which can be permanently installed and connected to the pressure system or separate devices which are optionally connected to the pressure system to be monitored via a connecting conduit and a suitable adapter connection are required for continuous monitoring of the various pressure systems.

The simplest types of compressed air systems include, for example, inflatable pillows, inflatable boots and bicycle or automobile tires which are inflated by means of a manual or motor-driven air pump. The air pressure is usually monitored by a single manometer which can be connected to the compressed air system by means of a valve connection. In this case, it is disadvantageous that a measurement can be made with a separate manometer only when the pumping process is interrupted and the air pump is disconnected from the valve connection. Obtaining a precise air pressure may then require interrupting the pumping process several times for the purpose of checking the pressure.

Furthermore, special pressure systems, such as pneumatic suspension systems on bicycle forks, may lose pressure when a check is made so that special measures must be taken with regard to the method used to measure the pressure.

Furthermore, the previously mentioned compressed air systems normally possess different kinds of valve connections. For example, a Schrader valve is used for automobiles and a Sclaverand valve is used for bicycles. The variety of valve designs requires that a manometer is provided with suitable adapter connections or that several different kinds of manometers are available for the individual application.

Furthermore, the size of the manometer is important. With regard to achieving a high degree of precision, the known manometers are either very heavy and unwieldy or are of such a size that does not permit direct installation in a manual air pump.

SUMMARY OF THE INVENTION

Therefore, the purpose of the invention is to create an indicator device which permits an extremely compact size and continuous measurement of the pressure with close tolerances during the pumping process.

The invention achieves this purpose in that the pistons are designed as control pistons and to function together with a indicator element by means of a groove and projection combination which translates the stroke of the control pistons into a revolving movement of the indicator element.

As the control pistons function together with an indicator element by means of a groove and projection combination, the piston's movement can be easily translated into a revolving movement, whereby a compact and space-saving construction can be chosen, for example, with the control pistons coaxially arranged inside the indicator element. In the simplest case, the indicator element, which moves in a revolving motion only, can comprise a sleeve provided with a scale or optionally labeling on its outer surface and indicates the respective pressure by means of indicator markings. The control pistons can, for example, be arranged axially within the indicator element, which permits a considerable reduction in the axial and radial size. In this case, a certain spring rate is applied to the control pistons by means of a spring, and this spring rate allows a nearly linear measurement within a relatively large pressure range and is chosen in accordance with the pressure range to be measured.

When the control piston comes into contact with the pressurized medium, the piston is moved axially in a cylindrical guide and against the spring resistance in accordance with the actual pressure. On the one hand, this permits continuous measurement of the actual pressure and, on the other hand, the pressurized space requires solely an extremely small amount of the pressurized medium, so that a great deal of pressure is not lost when a measurement is taken.

In a further embodiment of the invention, the control piston is provided with at least one ring-shaped projection which extends over at least part of the outer surface, and this projection is or each of these projections are directed into a spiral-shaped groove in the indicator element, or the control piston is provided with at least one spiral-shaped groove in each of which a ring-shaped projection on the indicator element is directed over at least part of the outer surface. With both embodiments of the groove and projection combination, each axial movement of the control piston causes a revolving movement of the indicator element, i.e., a double-walled indicator sleeve. The groove designed to guide the projection or the projection which can be assigned to the control piston or the indicator element has a spiral shape which extends in an axial direction. The pitch of the spiral can be adapted to the length of the indicator element, whereby the form of the ring-shaped projection on the control piston or the indicator element must also be adapted to the pitch of the spiral-shaped groove so that the groove and the projection do not jam.

To facilitate assembly and disassembly of the indicator device, the housing comprises a ring-shaped outer housing part and an inner coaxial housing insert, whereby the housing part and the housing insert are provided with at least one opening each as windows which overlap, or the outer housing part is transparent and the housing insert is provided with at least one opening as a window to permit reading of the scale on the outer surface of the indicator element.

The pressure can be regulated in that the front face of the outer housing part is provided with an opening for receiving a regulating button. This regulating button can be moved in an axial direction and is in contact with a spring when pushed outward in an extreme position, whereby in a further embodiment of the invention, the regulating button, when in its outer extreme position, seals off the pressurized space of the control piston, and when the regulating button is shifted inward in an axial direction, a connection between the pressurized space and the exterior can be created.

In a special embodiment of the invention, the center of the opposing front face of the housing insert is provided with a valve connection. This valve connection is provided with an inlet or a bored hole which is sealed off by a valve seal as a one-way valve and connected to the pressurized space.

When the regulating button is actuated, the pressure in the pressure system can be reduced, as the pressure system is connected via the valve connection and the one-way valve is connected to the pressurized space itself.

In another embodiment of the invention, the forward front face of the valve connection is provided with at least one peg so that the particular design of the valve connection of the indicator device permits the use of the manometer with a specially constructed adapter device provided with several different compressed air connectors. This makes it possible to connect the indicator device according to the invention via a bored hole in the front face.

BRIEF DESCRIPTION OF THE DRAWINGS

The invention is described in more detail on the basis of the drawings.

The following is shown.

DETAILED DESCRIPTION OF THE PREFERRED EMBODIMENT

Figure 1:
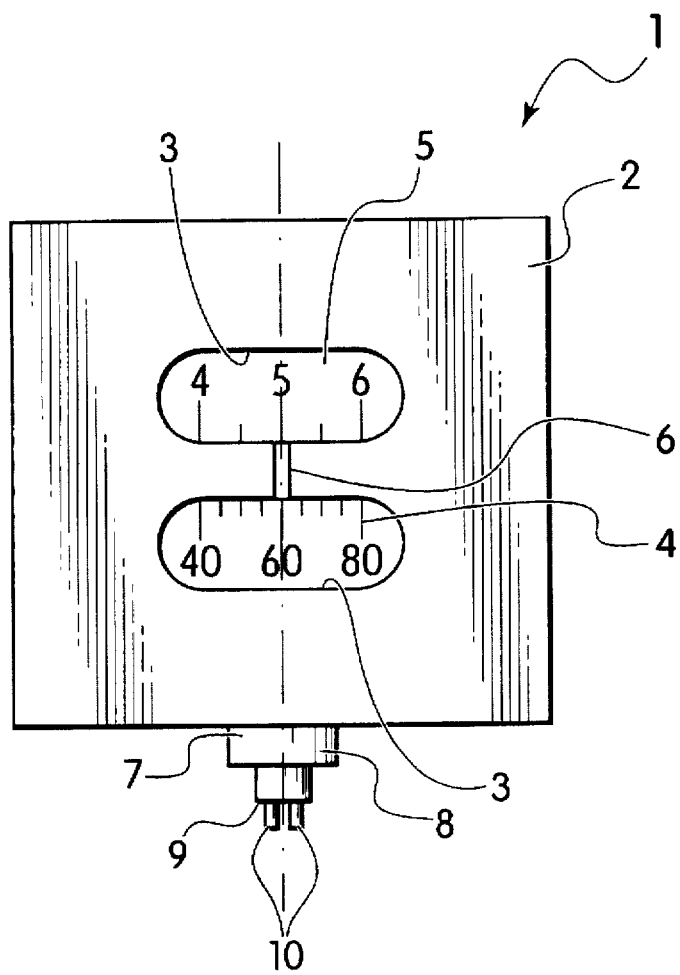
FIG. 1 an overhead view of an indicator device with a valve connection.

FIG. 1 shows a side view of the indicator device 1 which, for example, can be used to measure air pressure. The indicator device 1 comprises an outer housing part 2 into which two openings 3 are incorporated to function as windows. Each of the openings 3 comprises an oblong hole milled into the housing part 2. A scale which is milled into or adhered to the outer surface of the indicator element 5 and opposite the opening 3 can be read through the openings 3. A marking 6 located between the two windows 3 precisely indicates the pressure. The upper scale 4 shows, for example, a pressure in "BAR" and the lower scale 4 shows a pressure in "PSI."

Furthermore, the indicator device 1 is provided with valve connection 7 comprising a stepped projection 8 located in its center. The front face 9 of the projection 8 forms one piece with two diametrically opposed pegs 10 required for opening the valve or the seal of an adapter connection.

Figure 2:
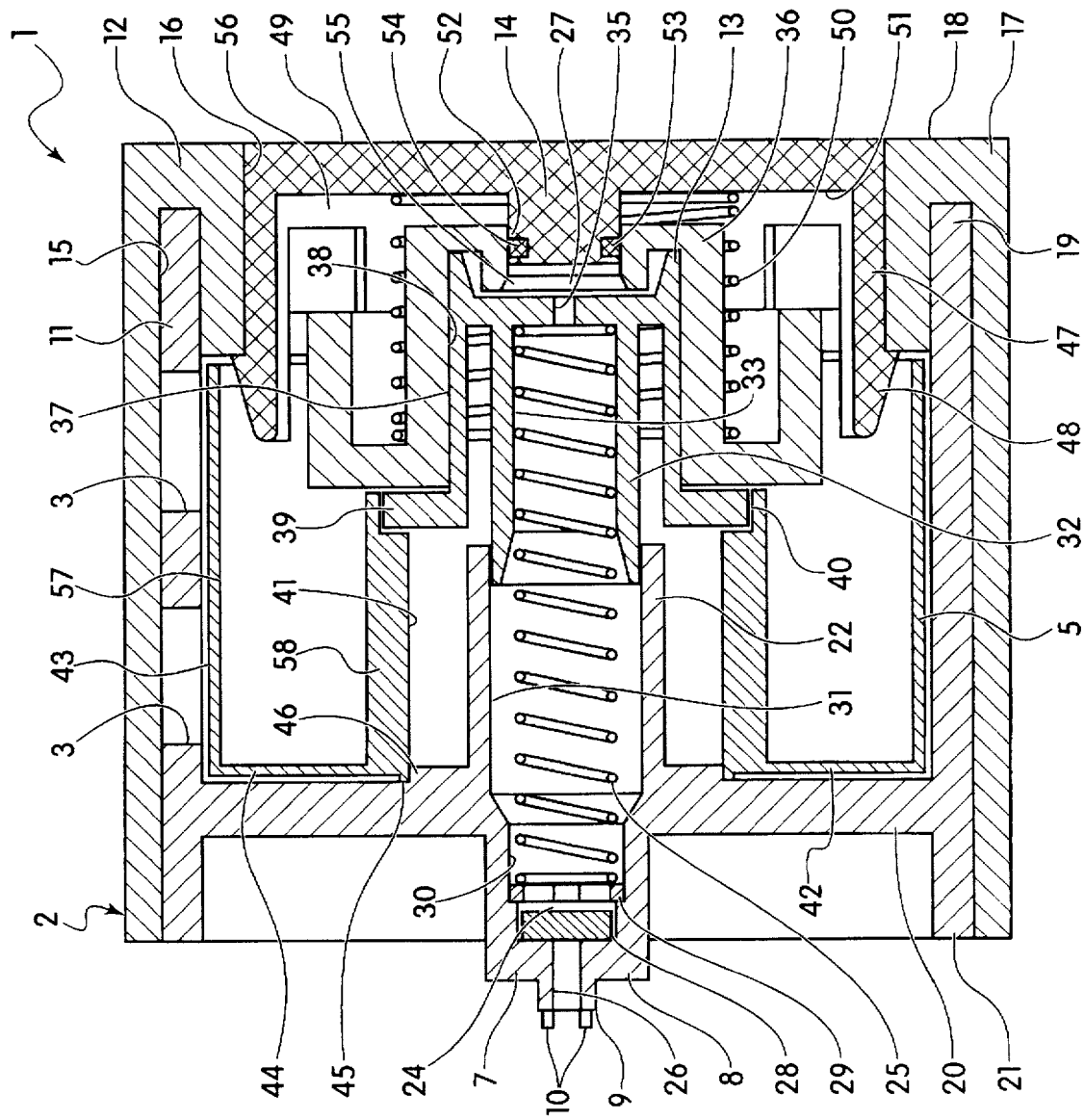
FIG. 2 a sectional side view of the indicator device after assembly.

FIG. 2 shows a sectional side view of the indicator device 1 after assembly. A cylindrical housing insert 11 has been inserted into the housing part 2 of the indicator device 1, and this housing insert 11 receives the indicator element 5, a control piston 13 and a regulating button 14.

The housing part 2, the housing insert 11, the indicator element 5 and the regulating button 14 are coaxially arranged in relation to one another and permit a very short axial length, whereby the radial size is also kept quite small. Furthermore, the control piston 13 is coaxially arranged inside the indicator element 5.

The outer housing part 2 has a double wall extending in a radial direction at one end, forming a ring-shaped pocket 15 into which the ring-shaped housing insert 11 is inserted. The double wall of the housing part 2 creates two radial legs, the longer of which is pointed outward and the shorter of which forms a circular opening 16 for receiving the regulating button 14. Together with the regulating button 14, the transition piece 17 of the housing part 2 forms the front face 18 of the indicator device 1, whereby the regulating button 14 is flush with the transition piece 17 in its extreme position.

The housing insert 11 extends with its ring-shaped projection 19 and is jammed or optionally cemented into the pocket 15 of the housing part 2. Furthermore, the ring-shaped projection 19 contains two windows 3 which permit a view of the indicator element 5. The outer housing part 2 can also be provided with a window for this purpose or alternately be transparent. Furthermore, the housing insert 11 is provided with a radial wall 20 to the left which is provided with a short ring-shaped projection 21 which extends outward and which terminates flush with the housing part 2. Furthermore, a ring-shaped projection 8, 22 forms a part of both sides of the wall 20 of the housing insert 11. The projection pointing inward 22 receives a valve seal 24, guides the control piston and receives a pressure spring 25. The projection pointing outward 8 of the housing insert 11 is opposite the wall 20 and the housing part 2 and permits the creation of a connection to a valve or an adapter device which is not shown. As can be seen in FIG. 1, the projection 8 is stepped and provided with two diametrically opposed pegs 10 on its front face 9 which open the valve or seal off the adapter device.

Furthermore, the projection 8 is provided with a central bored hole 26 which can be closed off with a valve seal 24 and which opens a connection to the pressurized space 27 of the control piston 13 when the valve seal 24 is open. The valve seal 24 comprises a valve plate 28 and a valve plate holder 29 and is mounted in a step-shaped and enlarged bored hole area 30, whereby the valve plate 28 is held in such a way that it can be moved axially through the valve plate holder 29 in the bored hole area 30. The amount of axial play of the valve plate 28 is determined by the valve plate holder 29, which is jammed into a different stepped area of the bored hole. The valve seal 24 is designed as a one-way valve so that the pressurized medium can flow through the bored hole 26 into the pressurized space 27, though it automatically closes the bored hole 26 in the presence of excessive pressure within the pressurized space 27 or when the pressure in the compressed air system falls. Furthermore, the step-shaped bored hole area 30 of the housing insert 11 verges into the bored hole 31 into which a hollow cylindrical inner projection 32 of the control piston 13 is directed. The bored hole 33 of the projection 32 and the bored hole 31 of the projection 22 contain an axially arranged pressure spring 25 which holds the control piston 13 in its extreme position when not under pressure.

When the control piston 13 is under pressure, it is moved against the force of the pressure spring 25 toward the valve seal 24 or the valve connection 7. The pressurized space 27 of the control piston 13 lies on the side of the projection 32 which faces away, whereby the pressurized medium can pass through the bored hole 31 and 33 and a further bored hole 35 to the pressurized space 27.

Furthermore, the pressurized space 27 is delimited by a radial wall 36 with several bends, and this radial wall 36, the center of which is in the shape of a pot, is provided with an cylindrical inner surface 38 in which the control piston 13 is directed with its outer ring-shaped wall surface 37. The axial lengths of the control piston 13 and the cylindrical surface 38 are such as to ensure sufficient guidance along the path of the axial stroke of the control piston 13. A ring-shaped projection 39 forms a part of the free end of the outer wall surface 37 of the control piston 13, and this ring-shaped projection 39 guides the control piston 13 into a groove 40 in the indicator element 5. This arrangement is advantageous in that a pair of projections 39 are diametrically opposed in each case and are adapted to the pitch of the groove in shape so that the projections 39 can be directed into the groove 40 incorporated into the inner surface 41 of the indicator element 5 in the shape of a spiral without jamming, whereby the grooves 40 are diametrically opposed spiral-shaped segments.

The indicator element 5 itself is double-walled in such a way as to create two coaxial sleeves which are connected to one another in one piece via a radial wall 42 and whereby the groove 40 is incorporated into the inner surface 41 of the inner sleeve and one or more scales 4 are incorporated into or adhered to the outer surface 43 of the outer sleeve.

When the control piston 13 is in contact with the pressurized medium, the former is moved in an axial direction towards the valve connection 7, which simultaneously causes the indicator element 5 to rotate as a result of the working connection, i.e., the groove and projection combination 39, 40. The scale 4 can be calibrated according to the chosen pressure spring 25 so that the pressures of the pressurized medium are indicated, for example, in "BAR" or "PSI." For the purpose of reducing the friction created when the indicator element 5 is rotated, its front face 44 is provided with a small ring-shaped projection 45 which comes to rest on the radial wall 20 of the housing insert 11. The indicator element 5 is guided in a radial direction by a projection 46 extending from the radial wall 20. Furthermore, the wall 20 is set back from the housing 2 and towards the interior to permit the mounting of the indicator device 1 on a valve connection or an adapter device which is not shown.

The pressure in the pressurized space 27 and therefore in the pressure system is regulated by means of a regulating button 14, which is positioned in the opening 16 in the housing part 2 in such a way that it can move in an axial direction. The regulating button 14 comprises a cylindrical basic body with a closed front face which forms the front face 18 of the indicator device 1 together with the housing part 2. Furthermore, the basic body is provided with a ring-shaped projection 47, the free end of which is provided with one or more areas which possesses or possess a radial retaining nose 48 projecting in a radial direction. The retaining noses 48 project through the radial wall 36 of the housing part 2 provided with several bends and grip the rear of the shorter end of the double-walled area of the housing part 2 for the purpose of fixing it. The retaining noses 48 delimit the extreme axial position of the regulating button 14. A shift toward the interior of the housing 2 is possible when pressure is applied to the outer surface 49 of the regulating button 14, whereby the force of a spring 50 adjacent to the regulating button on the inner surface which supports the radial wall 36 must be overcome. Furthermore, a ring-shaped projection 52 forms one piece with the inner side 51 of the regulating button 14 and is provided with a groove 53 with an inserted sealing ring 54 on its axial surface. The projection 52 is directed into a bored hole 55 located in the center of the radial wall 36 of the housing part 2 and terminates in the pressurized space 27 over a conical section 55. The pressurized space 27 is sealed off from the outside by the sealing ring 54 in the groove 53 in the extreme position of the regulating button 14, which is determined by the spring 50. When the regulating button 14 is shifted towards the interior of the housing 2, the groove 53 is shifted into the conical section 55 so that the sealing effect of the sealing ring 54 is eliminated. In this case, the pressurized medium can pass from the pressurized space 27 to the empty space between the regulating button 14 and the radial wall 36 and into the open air by passing between circular opening 16 and the regulating button 14. Due to the additional connection between the pressurized space 27 and the bored hole 26 in the valve connection 7, the pressure of the compressed air system to be measured may be reduced by releasing the pressurized medium through the valve seal 24.

Figure 3:
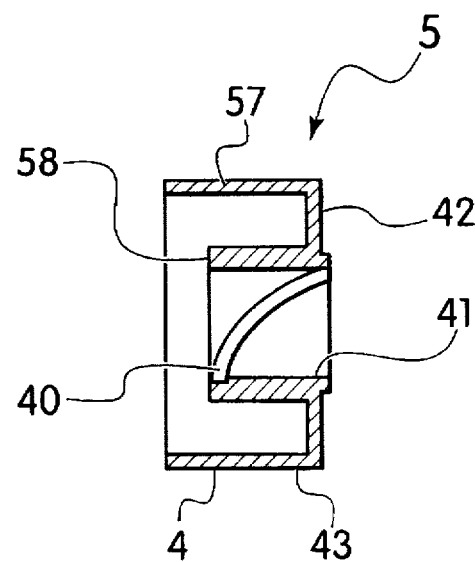
FIG. 3 a sectional side view of the indicator device.

FIG. 3 shows a sectional side view of the indicator element 5, which is designed with a double wall so that two coaxial sleeves 57, 58 are created which are connected to one another via a radial wall 42, whereby the grooves 40 are incorporated into the inner surface 41 of the inner sleeve and one or more scales 4 is or are incorporated into or adhered to the outer surface 43 of the outer sleeve. The projections 39 of the control piston 13 are directed into the spiral-shaped grooves 40, all of which extend over solely a section of a spiral and which diametrically oppose one another on the inner surface 41. When the control piston 13 moves in an axial direction, the projections 39 on the control piston 13 and the groove 14 translate this axial movement into a rotation of the indicator element 5 which is proportional to the pressure in the pressurized space 27.

Figure 4:
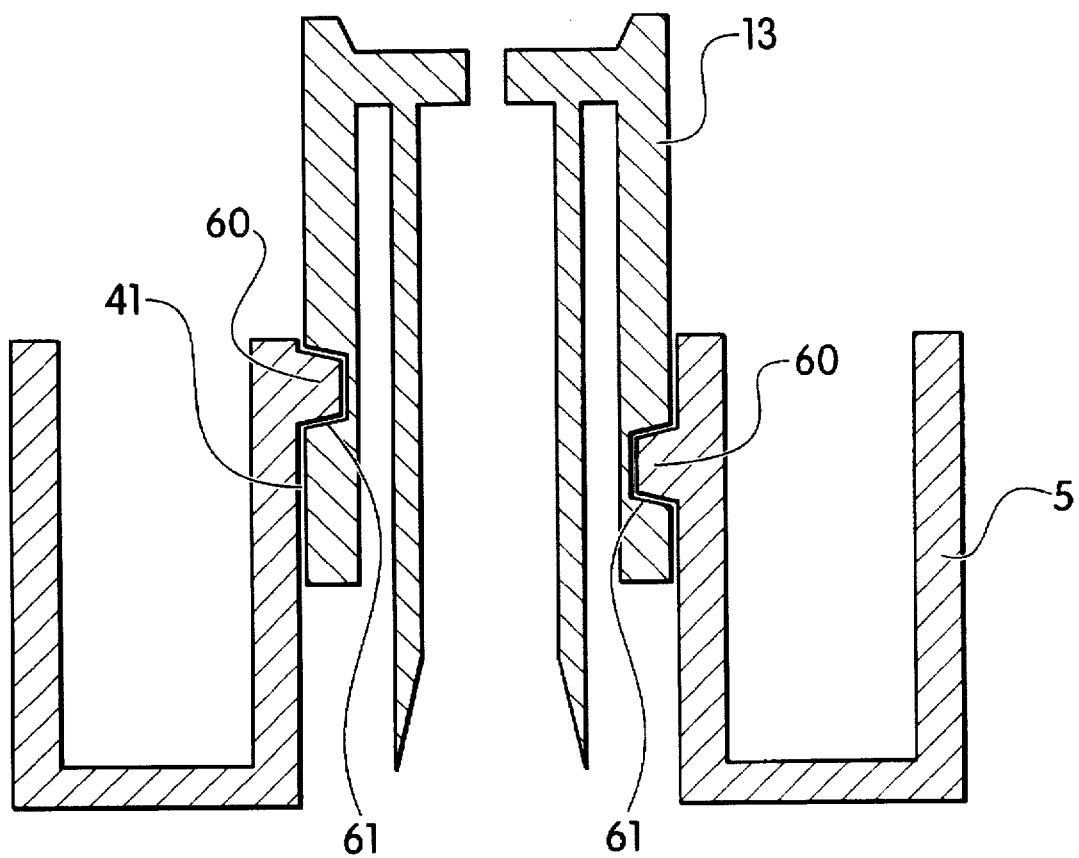
FIG. 4 is a cross-sectional side view of an alternative embodiment of the indicator element and control piston according to the invention.

FIG. 4 shows a side cross-sectional view of an alternative embodiment of the indicator device, in which instead of spiral shaped groove on the indicator element and a ring shaped projection on the piston as shown in FIG. 3, there is a ring-shaped projection 60 extending across the inner surface 41 of the indicator element 5. Projection 60 is adapted to engage spiral shaped groove 61 on the control piston 13.

I claim:

1. An indicator device for use as a manometer, comprising:

a housing having an inlet opening for a pressure medium to be measured and a pressurized space within the housing;

a spring-loaded control piston having an outer surface and arranged within said housing, said control piston being adapted to receive the pressure medium;

an indicator element mounted within said housing and having an inner surface;

a valve seal arranged within said housing and adapted to seal the pressurized space;

a regulating button located on the opposite side of the pressurized space from the inlet opening, said regulating button being co-planar with said housing on the opposite side of the pressurized space from the inlet opening and being axially movable and adapted to selectively ventilate the housing;

at least one projection located on one of the outer surface of the piston or the inner surface of the indicating element;

a groove located on the other of the outer surface of the piston or the inner surface of the indicating element; and means for connecting the indicator device to a pump so that pressure can be measured during operation of the pump;

wherein the groove engages the projection and converts the stroke movement of the piston into a rotating movement of the indicator element.

2. An indicator device as claimed in claim 1, wherein the control piston is provided with at least one ring-shaped projection which extends over at least a part of the outer surface and which is guided into a spiral-shaped groove in the indicator element.

3. An indicator device as claimed in claim 1, wherein the control piston is provided with at least one spiral-shaped groove into which at least one ring-shaped projection on the indicator element, which extends over at least a part of the inner surface of the indicator element, is guided.

4. An indicator device as claimed in claim 2, wherein the shape of the ring-shaped projection on the control piston is adapted to the pitch of the spiral-shaped groove.

5. An indicator device as claimed in claim 1, wherein the housing comprises a ring-shaped outer housing part having a front face and at least one opening and a coaxial internal housing insert having at least one opening and wherein said at least one opening in the housing part and said at least one opening in the housing insert overlap to form a window.

6. An indicator device as claimed in claim 5, wherein the outer housing part is transparent and the housing insert is provided with at least one opening as a window.

7. An indicator device as claimed in claim 5, further comprising
an opening for receiving the regulating button located in the front face of the outer housing part, and a spring attached to the regulating button, wherein the regulating button can be moved in an axial direction and is pressed outward in an extreme position by the spring.

8. An indicator device as claimed in claim 7, wherein the regulating button seals off the pressurized space of the control piston in its outer extreme position, and wherein a connection is created between the pressurized space and the open air when the regulating butting is shifted inward in an axial direction.

9. An indicator device as claimed in claim 5, wherein the housing insert has an opposing front face located on the opposite side of the housing from said front face of said outer housing part, and wherein a valve connection is located in the center of the opposing front face of the housing insert and is provided with an inlet or bored hole which is sealed off by the valve seal as a one-way valve and which is connected to the pressurized space.

10. An indicator device as claimed in claim 9, wherein the forward front face of the valve connection is provided with at least one peg.

11. An indicator device as claimed in claim 9, wherein the valve connection is adapted for being received in an adapter device.

* * * * *